(12) United States Patent
Kobayashi et al.

(10) Patent No.: US 7,630,050 B2
(45) Date of Patent: Dec. 8, 2009

(54) LIQUID CRYSTAL DISPLAY PANEL WITH A CONTINUOUS WEIR AND A DISCONTINUOUS WEIR COVERED BY A SEALING MATERIAL

(75) Inventors: Setsuo Kobayashi, Mobara (JP); Hiroaki Miwa, Yokohama (JP); Katsuhiko Ishii, Chosei (JP)

(73) Assignee: Hitachi Displays, Ltd., Chiba (JP)

( * ) Notice: Subject to any disclaimer, the term of this patent is extended or adjusted under 35 U.S.C. 154(b) by 111 days.

(21) Appl. No.: 11/672,602

(22) Filed: Feb. 8, 2007

(65) Prior Publication Data

US 2007/0182912 A1 Aug. 9, 2007

(30) Foreign Application Priority Data

Feb. 8, 2006 (JP) ............... 2006-031263

(51) Int. Cl.
*G02F 1/1339* (2006.01)
(52) U.S. Cl. ............ 349/153; 349/154; 349/156; 349/190
(58) Field of Classification Search .......... 349/154, 349/153, 190
See application file for complete search history.

(56) References Cited

U.S. PATENT DOCUMENTS

| 6,646,709 B2 | 11/2003 | Matsumoto | |
|---|---|---|---|
| 7,391,493 B2 * | 6/2008 | Kim | 349/155 |
| 2002/0131009 A1 * | 9/2002 | Takeuchi | 349/153 |
| 2003/0112404 A1 * | 6/2003 | Kim | 349/153 |
| 2004/0160566 A1 * | 8/2004 | Kawabe et al. | 349/153 |
| 2006/0077334 A1 * | 4/2006 | Kim et al. | 349/153 |
| 2007/0153211 A1 * | 7/2007 | Whitehead, Jr. et al. | 349/153 |
| 2007/0182912 A1 * | 8/2007 | Kobayashi et al. | 349/153 |

FOREIGN PATENT DOCUMENTS

| JP | 3210109 | 6/1994 |
|---|---|---|
| JP | 2001-133795 | 5/2001 |
| JP | 3281362 | 8/2001 |
| JP | 2002-202512 | 7/2002 |
| JP | 2004-170521 | 6/2004 |

\* cited by examiner

*Primary Examiner*—Andrew Schechter
*Assistant Examiner*—Dennis Y Kim
(74) *Attorney, Agent, or Firm*—Antonelli, Terry, Stout & Kraus, LLP.

(57) ABSTRACT

The present invention provides a liquid crystal display panel which can prevent a leak path of a sealing material when liquid crystal is brought into contact with an uncured sealing material in a sealing step and a manufacturing method thereof. In a liquid crystal display panel which forms a display region by providing liquid crystal in a gap defined between one substrate and another substrate, a weir which is continuously formed so as to surround the display region and a sealing material which is arranged to cover the weir are arranged on a surface of one substrate.

7 Claims, 6 Drawing Sheets

LIQUID CRYSTAL DISPLAY PANEL WITH A CONTINUOUS WEIR AND A DISCONTINUOUS WEIR COVERED BY A SEALING MATERIAL

CROSS-REFERENCE TO RELATED APPLICATIONS

The disclosure of Japanese Patent Application No. 2006-31263 filed on Feb. 8, 2006 including the specification, drawings and abstract is incorporated herein by reference in its entirety.

BACKGROUND

1. Field of the Invention

The present invention relates to a liquid crystal display panel and a manufacturing method thereof, and is characterized in that in dripping liquid crystal to one of a pair of substrates and sealing one substrate to another substrate using a sealing material, the interference between the dripped liquid crystal and the sealing material and the sealing failure attributed to the intrusion of the liquid crystal or air into the sealing material at the time of sealing can be prevented.

A liquid crystal display device has been popularly used in various monitors, a display device of electronic equipment or a television receiver set. The liquid crystal display device is basically constituted by assembling a liquid crystal display panel which seals liquid crystal between a pair of substrates, a drive circuit which drives the liquid crystal display panel and the like.

Figure 8:
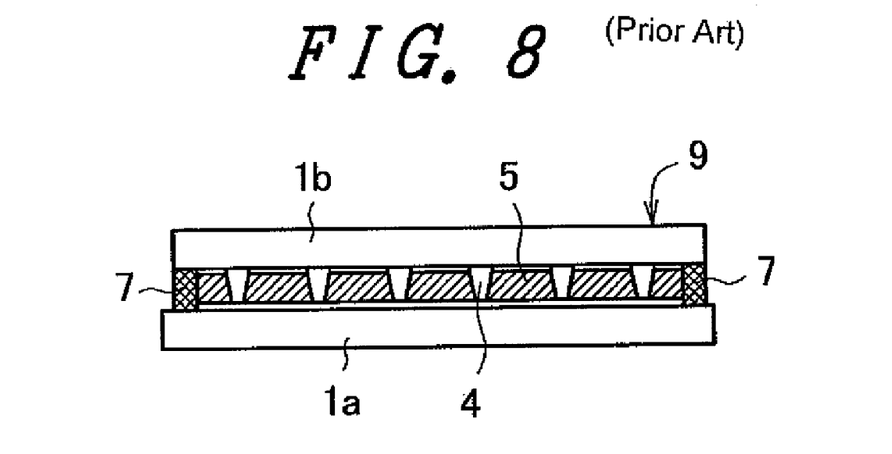
FIG. 8 is a cross-sectional view for schematically explaining a constitutional example of the liquid crystal display panel.

FIG. 8 is a cross-sectional view for schematically explaining a constitutional example of the liquid crystal display panel. Here, the explanation is made by taking an active-matrix-type liquid crystal display panel which uses a thin film transistor (TFT) as an active element which selects each pixel on one of a pair of (hereinafter, also referred to as two) substrates as an example. However, the present invention is not limited to the active-matrix-type liquid crystal display panel and is also applicable to a liquid crystal display panel of other type in the same manner.

In FIG. 8, the liquid crystal display panel 9 is configured such that liquid crystal 5 is sandwiched between a substrate (TFT substrate) 1a on which pixels are formed using a thin film transistor and a color filter substrate (CF substrate) 1b which forms three colors of red (R), blue (B), green (G), and peripheries of both substrates are sealed by a sealing material 7. As a manufacturing method of such a liquid crystal display panel 9, two methods, that is, a vacuum filling method and a dripping method have been roughly proposed. Here, in FIG. 8, spacers 4 are formed as so-called columnar spacers (SOC) which are directly and fixedly formed on the CF substrate 1b side. However, the method which scatters bead-like spacers on one substrate is also known. In the dripping-type liquid crystal display panel, the columnar spacers are used in many cases and hence, in the manufacturing method of the present invention which is explained hereinafter, the liquid crystal display panel which uses the columnar spacers is explained.

The vacuum filling method is a method which assembles a TFT substrate 1a and a CF substrate 1b and, thereafter, fills liquid crystal 5 in a space which is formed by a gap defined between the TFT substrate 1a and the CF substrate 1b by way of spacers 4. On the other hand, the dripping method is a method which, first of all, drips a predetermined quantity of liquid crystal 5 to either one of a TFT substrate 1a or a CF substrate 1b and, thereafter, another substrate is overlapped to one substrate thus performing the assembling of a liquid crystal display panel 9 and the filling of the liquid crystal 5 simultaneously. Usually, a gap between the TFT substrate 1a and the CF substrate 1b of the liquid crystal display panel 9, that is, a cell gap is 3 μm to 5 μm and hence, the cell gap is extremely small.

To completely fill the liquid crystal in the space defined by the gap of 3 μm to 5 μm using the vacuum filling method, first of all, the TFT substrate 1a and the CF substrate 1b are adhered to each other and peripheries of both substrates are adhered to each other using the sealing material 7. Here, a liquid crystal filling port is formed in a portion of the sealing material 7. Next, a vacuum evacuation operation of a space defined by the adhesion of the TFT substrate 1a and the CF substrate 1b is performed using a vacuum chamber or the like. Thereafter, liquid crystal is brought into contact with the liquid crystal filling port and the liquid crystal is filled into the inside of the adhesion gap (space) between the TFT substrate 1a and the CF substrate 1b by making use of a capillary phenomenon and the pressure difference between pressures inside and outside the space.

However, when this method is adopted, the vacuum evacuation of the cell gap space of 3 μm to 5 μm and the injection operation of the liquid crystal in the cell gap space require an extremely long time. Particularly, along with increase of a demand for a narrower gap of the liquid crystal display panel hereinafter, it is predicted that a filling time of liquid crystal is steadily increased. Further, it is necessary to provide a step which closes a filling port after the completion of filling of the liquid crystal and hence, the liquid crystal filling step is one of factors which elevate a manufacturing cost.

On the other hand, when the dripping method is adopted, this method is a method which performs panel assembling for adhering the TFT substrate 1a and the CF substrate 1b and filling of the liquid crystal simultaneously and hence, a vacuum evacuation operation which brings the space having the adhesion gap of 3 μm to 5 μm defined between the TFT substrate 1a and the CF substrate 1b into a reduced-pressure atmosphere is unnecessary. Further, an operation to seal the liquid crystal filling port is no more necessary. Further, since the liquid crystal is dripped using a dispenser or the like, liquid crystal filling time is also accelerated. Accordingly, by adopting the dripping method, it is possible to largely shorten the time necessary for filling the liquid crystal in the inside of the adhesion gap between the TFT substrate 1a and the CF substrate 1b compared to the vacuum filling method.

FIG. 9A to FIG. 9E are explanatory views of a manufacturing method of a liquid crystal display panel using a dripping method. Here, the explanation is made with respect to an example in which columnar spacers 4 explained in conjunction with FIG. 8 are preliminarily incorporated in the CF substrate 1b.

Figure 9A:
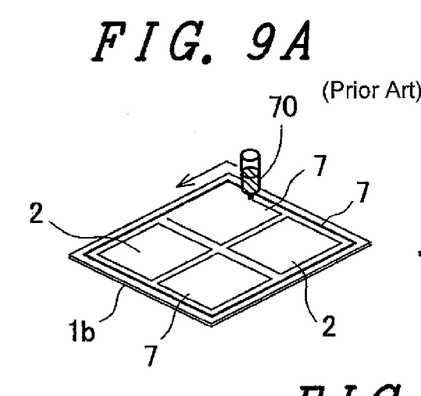
FIG. 9A to FIG. 9E are explanatory views of a manufacturing method of the liquid crystal display panel using a dripping method.
Figure 9B:
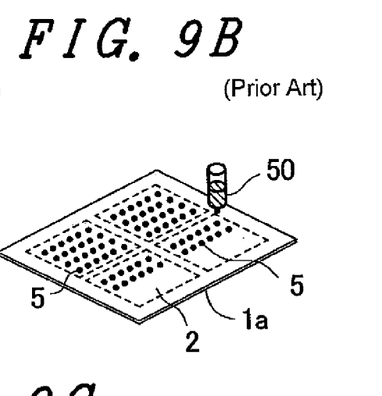
Figure 9C:
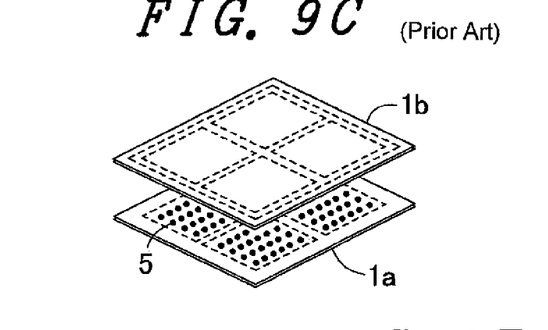

First of all, a sealing material 7 is applied to a TFT substrate 1a in a frame shape using a dispenser 70 in a state that the sealing material 7 surrounds a display region 2 (FIG. 9A). A predetermined quantity of liquid crystal 5 is dripped at positions inside the sealing material 7 using a dispenser 50 (FIG. 9B). Two substrates (the TFT substrate 1a and the CF substrate 1b) are aligned and adhered to each other in a reduced-pressure atmosphere (FIG. 9C).

Figure 9D:
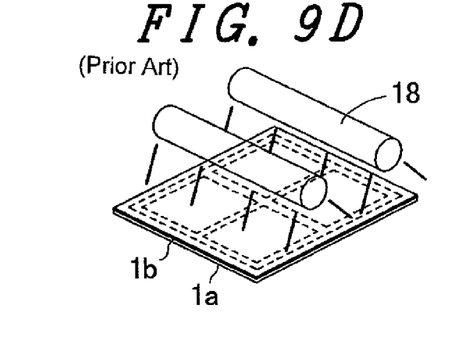
Figure 9E:
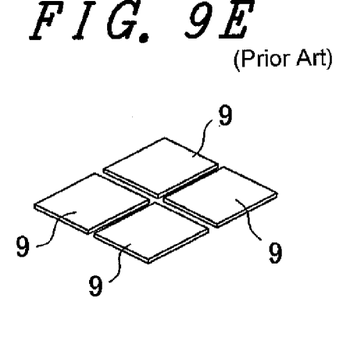

After completion of the adhesion, two substrates are taken out from the reduced-pressure atmosphere and are brought into an atmospheric pressure atmosphere. For curing the sealing material 7, treatment such as the radiation of ultraviolet lays using an ultraviolet lamp 18 in conformity with a curing condition of the sealing material 7 or heating of the adhered substrates are performed (FIG. 9D). Finally, two substrates are cut into individual panels having a predetermined panel size (FIG. 9E). The liquid crystal display panel 9 is completed by performing the above-mentioned steps.

There are many patent documents which disclose the related art on the filling of liquid crystal by a dripping method. For example, Japanese Patent No. 3210109 (patent document 1) discloses a technique which prevents dripped liquid crystal from flowing to a neighboring portion by forming a bank (weir) on a sealing portion. Further, Japanese Patent No. 3281362 (patent document 2) discloses the constitution in which concave-convex structure is provided to respective seal portions of two substrates, these concave-convex structures are fitted to each other, and a sealing material is applied to outer peripheries of the concave-convex structures thus preventing a contact between liquid crystal and the sealing material.

2. Description of the Related Arts

The filling of liquid crystal by the dripping method shown in the related art mainly uses a liquid crystal filling technique of a large-sized liquid crystal display device having a large display screen size. However, such a liquid crystal filling technique is not applied to an intermediate-size or miniaturized liquid crystal display device having a small display screen sizes.

This is because that the application of the liquid crystal filling technique of the large-sized liquid crystal display device has a following drawback. That is, as shown in FIG. 9B, with respect to the large-sized liquid crystal display device having the large display screen, a dripping quantity, dripping positions and the like can be adjusted by dripping the liquid crystal at a large number of dripping points from the dispenser 50, while with respect to the intermediate-size or the miniaturized liquid crystal display device having the small display screen, the number of dripping points from which the liquid crystal is dripped to a display screen (also referred to as a display region) is remarkably small compared to the number of dripping points for the large-sized liquid crystal display device and hence, the adjustment of the dripping quantity and the dripping positions are extremely difficult.

Accordingly, the size of the liquid crystal display panel is miniaturized, a distance between the dripped liquid crystal and the sealing material is small and hence, the sealing material is brought into contact with the liquid crystal before being cured in the sealing step thus generating a leak path in the sealing material or generating the intrusion of air or liquid crystal into the sealing material whereby the sealing material is deteriorated. Further, a sealing effective width is decreased thus lowering the reliability of the sealing material.

Figure 10A:
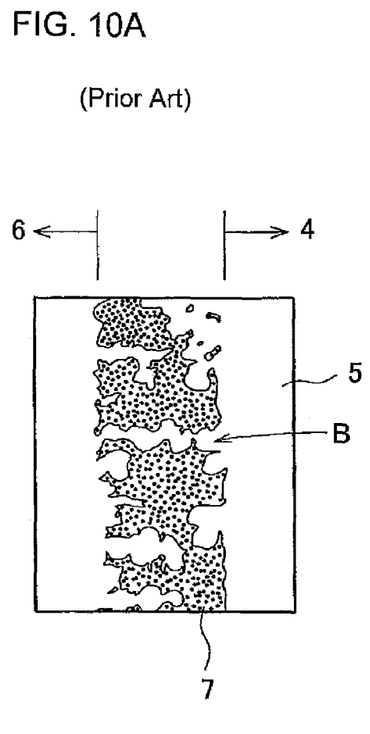
FIG. 10A is an explanatory view of a leak path of the sealing material.
Figure 10B:
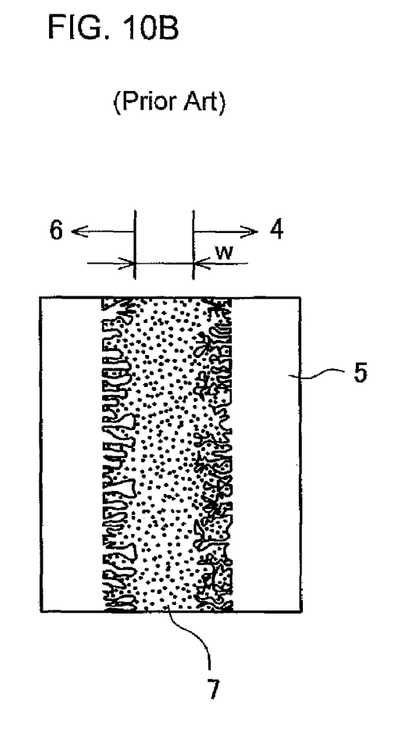
FIG. 10B is a view for explaining an occurrence of intrusion of the liquid crystal or air into the sealing material.

FIG. 10A and FIG. 10B are schematic views for explaining the sealing failure which occurs when the sealing material is brought into contact with the liquid crystal before being cured. FIG. 10A is the explanatory view of the leak path in the sealing material, wherein numeral 7 indicates a sealing material, numeral 4 indicates a liquid crystal side (display region side), and numeral 6 indicates an atmosphere side or a reduced-pressure atmosphere side. When liquid crystal 5 in the display region 4 is brought into contact with the sealing material 7 before being cured, the liquid crystal 5 breaks the soft sealing material 7 thus forming leak paths B through which the liquid crystal 5 flows out to the atmosphere side or the reduced-pressure atmosphere side.

Further, FIG. 10B is a view for explaining the occurrence of intrusion of air or liquid crystal into the sealing material. When the liquid crystal 5 reaches the sealing material 7 before being cured, the liquid crystal intrudes into the sealing material 7 thus narrowing an effective width of the sealing material 7. Further, this intrusion also occurs on the atmosphere side or the reduced-pressure atmosphere side. As a result, the effective sealing width W is narrowed from both sides and hence, the sealing material 7 cannot acquire a sufficient sealing effect.

It is an object of the present invention to provide a liquid crystal display panel and a manufacturing method thereof which can prevent the occurrence of a leak path of a sealing material and the reduction of an effective sealing width which are brought about due to a contact of liquid crystal with an uncured sealing material in a sealing step.

SUMMARY OF THE INVENTION

According to one aspect of the present invention, the present invention provides a liquid crystal display panel which forms a display region by providing liquid crystal in a gap defined between one substrate and another substrate, wherein a weir which is continuously formed so as to surround the display region and a sealing material which is arranged to cover the weir are arranged on a surface of one substrate.

Due to such a constitution, the present invention can provide a favorable liquid crystal dripping-type liquid crystal display panel irrelevant to a size of a display screen. Here, the present invention is also characterized by a constitutional feature that the weir is continuously formed. This is because that when the weir is cut even at one portion thereof, there arises a drawback that the liquid crystal intrudes the sealing material through such a portion.

Further, on either one of the surface of one substrate or a surface of another substrate, in the display region, spacers which control a distance between one substrate and another substrate are arranged.

By forming the weir of this aspect of the invention simultaneously with the formation of the spacers, it is possible to form the spacers without increasing a manufacturing step. Here, it is necessary to form the spacers and the weirs in a state that the spacers and the weirs differ from each other in height from a surface of the substrate, to form the spacers and the weir without increasing the manufacturing step, the spacers may be formed of a columnar spacer and, for example, the columnar spacers and the weir may be formed on the substrate side on which color filters are arranged. This is because that, on the substrate on which the color filters are arranged, a thickness of the substrate in the display region is made larger than a thickness of a peripheral portion of the substrate on which the sealing material is arranged by a thickness of the color filters and hence, the columnar spacers and the weir differ in height of a mount on which the columnar spacers and the weir are arranged whereby the columnar spacers and the weir are automatically formed with heights different from each other from the surface of the substrate. Further, when the heights of the mounts on which the columnar spacers and the weir are arranged are equal, a half-tone mask may be used.

Further, by forming the weir simultaneously with formation of lines on the display region, it is also possible to form the weir without increasing the manufacturing step.

By forming two weirs inside the sealing material, it is possible to prevent both of the intrusion of the liquid crystal and pushing-in of atmosphere. Further, a surrounding intermediate weir may be arranged between these two weirs. Here, by forming the intermediate weir discontinuously, the adhesiveness between the sealing material and the substrate is not damaged. Further, by forming the weir in a zigzag shape, a contact area between the weir and the sealing material can be increased thus enhancing the adhesiveness between the sealing material and the substrate. It is needless to say that the intermediate weir may be also formed in a zigzag shape.

According to another aspect of the present invention, the present invention provides a manufacturing method of a liquid crystal display panel which fills liquid crystal into a gap defined between one substrate and another substrate and seals both substrates using a sealing material which is circumferentially applied outside a display region tracing a profile of the display region, wherein the manufacturing method includes the steps of forming a continuous weir in a state that the weir surrounds the display region on one substrate, arranging spacers on one substrate or another substrate, applying a sealing material to one substrate in a frame shape in a state that the sealing material covers the formed weir, dripping the liquid crystal into the inside of the frame-shaped sealing material, aligning one substrate with another substrate in a reduced-pressure atmosphere and adhering one substrate and another substrate to each other while defining a gap therebetween, and curing the sealing material between one substrate and another substrate after the completion of adhesion of one substrate and another substrate.

Due to such a manufacturing method, it is possible to provide a manufacturing method of a favorable liquid crystal dripping-type liquid crystal display panel irrelevant to a size of the display screen.

According to the present invention, it is possible to obtain a highly reliable liquid crystal display panel which prevents sealing failure attributed to the interference between dripped liquid crystal and a sealing material or the intrusion of liquid crystal or air into the sealing material at the time of sealing.

BRIEF DESCRIPTION OF THE DRAWINGS

FIG. 10A and FIG. 10B are schematic views for explaining the sealing failure which occurs when a sealing material is brought into contact with liquid crystal before being cured, wherein

DETAILED DESCRIPTION OF THE INVENTION

Hereinafter, best mode for carrying out the present invention is explained in detail in conjunction with drawings showing embodiments.

Figure 6:
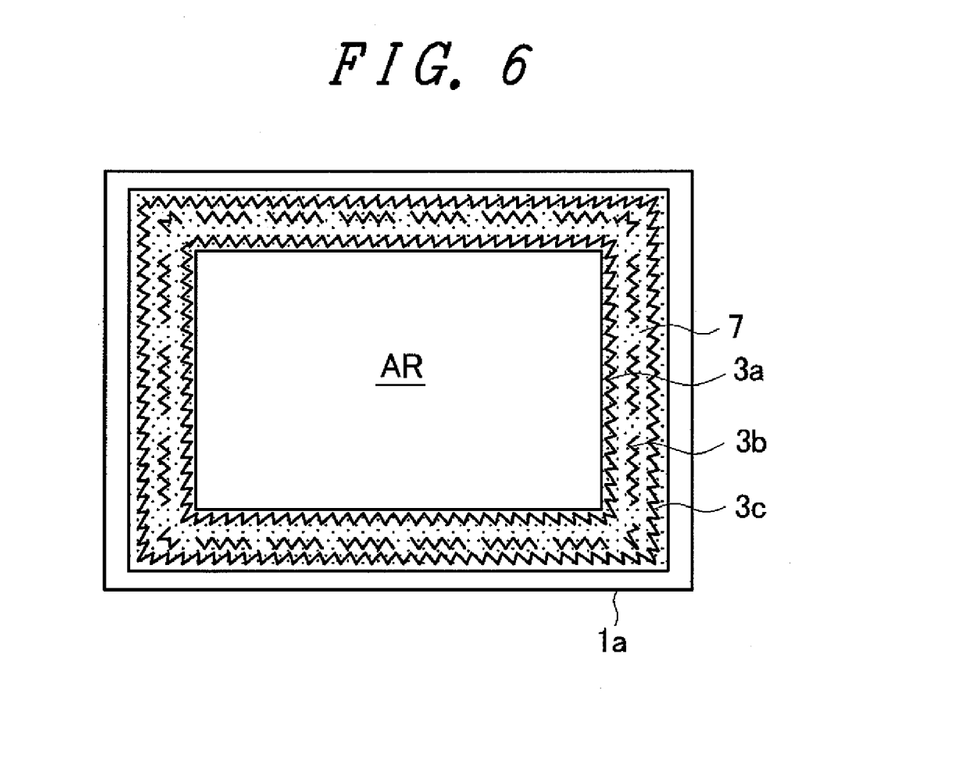
FIG. 6 is a plan view of one substrate for explaining a liquid crystal display panel of an embodiment 3 according to the present invention.
Figure 7:
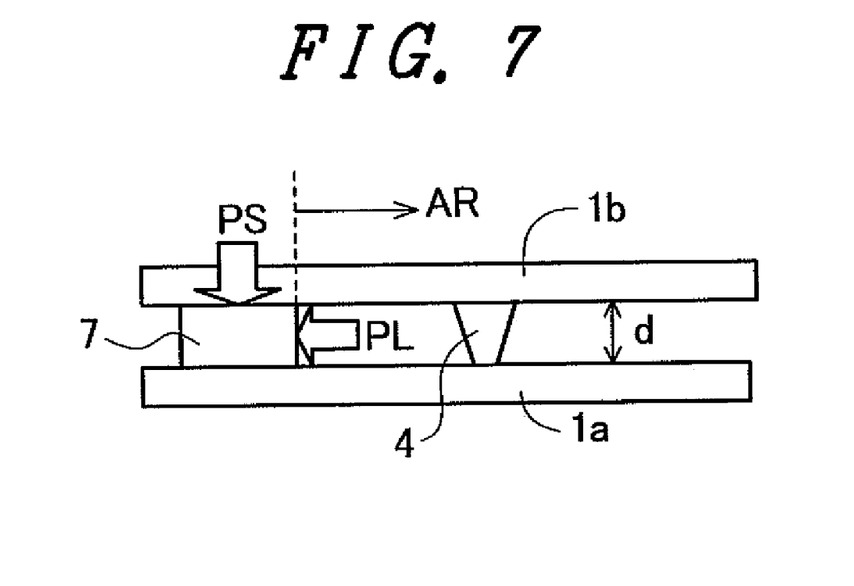
FIG. 7 is an explanatory view for explaining a drawback to be solved by the present invention.

First of all, drawbacks to be solved by the present invention are summarized using FIG. 7. FIG. 7 is an enlarged view of the constitution of an end portion in FIG. 6. Numeral 1a indicates a TFT substrate, numeral 1b indicates a CF substrate, and numeral 7 indicates a sealing material. As a means for suppressing an intruding force (PL) of liquid crystal into the sealing material 7, the sealing material 7 may be made of a hard sealing material. However, when the sealing material 7 becomes excessively hard, it is necessary to increase the force PS in adhering the TFT substrate 1a and the CF substrate 1b to each other and hence, it is difficult to adjust a desired cell gap d.

The present invention provides the structure of the sealing material and the structure of the liquid crystal display device which can simultaneously solve these two drawbacks with respect to such a sealing material.

Embodiment 1

Figure 1:
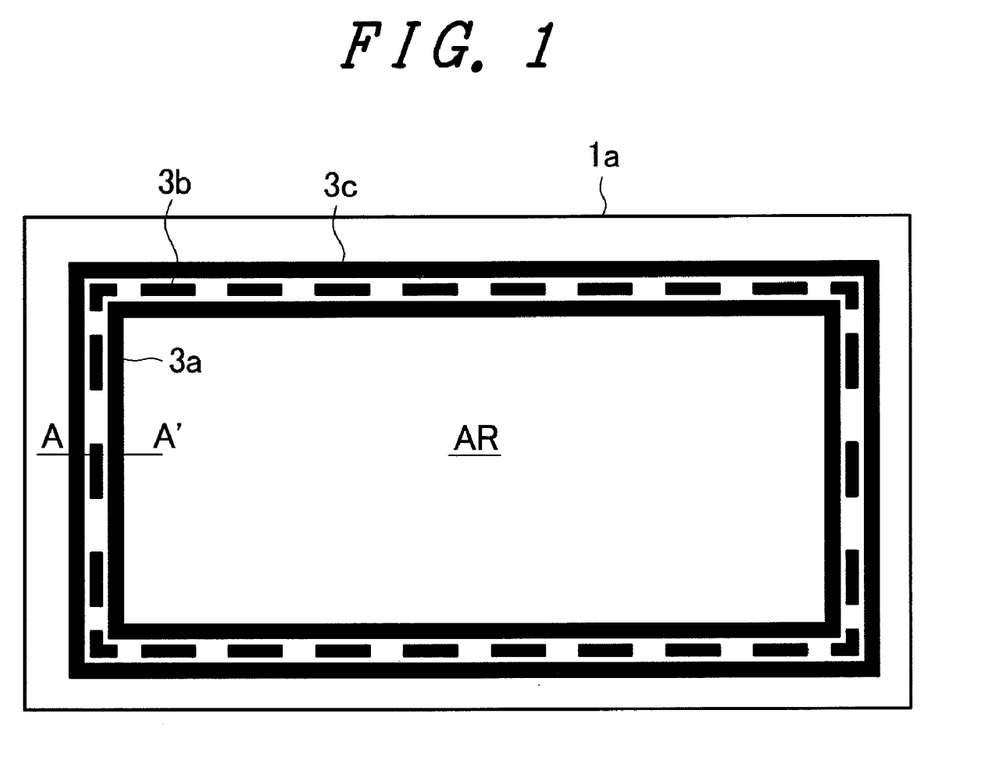
FIG. 1 is a plan view of one substrate for explaining a liquid crystal display panel of an embodiment 1 according to the present invention.

FIG. 1 is a plan view of one substrate for explaining a liquid crystal display panel of an embodiment 1 according to the present invention. Here, first, second and third weirs 3a, 3b and 3c are formed on an outer periphery of a display region AR of one substrate 1a which constitutes a TFT substrate.

Out of these weirs 3a, 3b and 3c, the innermost peripheral weir 3a and the outermost peripheral weir 3c are continuously formed over the entire circumference in a closed bank shape. Further, the weir 3b arranged between the innermost peripheral weir 3a and the outermost peripheral weir 3c is formed in a discontinuous shape including a plurality of gaps which traverse the surrounding direction of the weirs 3a, 3c.

Figure 2:
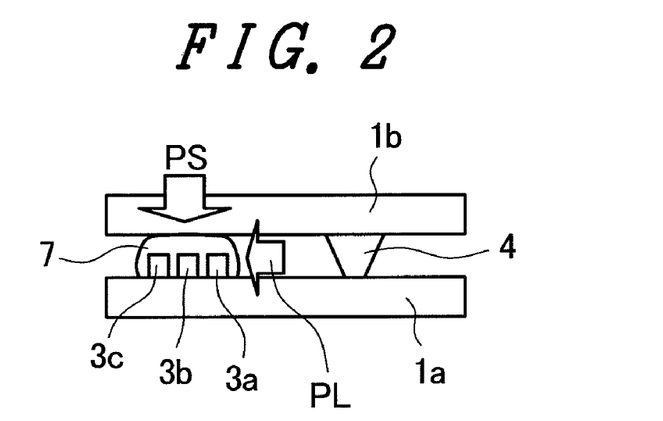
FIG. 2 is a cross-sectional view taken along a line A-A' in FIG. 1.

FIG. 2 is a cross-sectional view taken along a line A-A' in FIG. 1. As shown in FIG. 2, this embodiment is characterized in that the sealing material 7 is arranged in a state that the sealing material 7 covers the weirs 3a, 3b and 3c which are arranged on the TFT substrate 1a.

Due to such a constitution, the intruding force (PL) of liquid crystal into the sealing material 7 can be prevented by the weir 3a having a hardness larger than the hardness of the sealing material 7. Here, the hardness of the sealing material and the hardness of the weir imply the hardness in a state that the sealing material is not cured. After curing the sealing material 7, the hardness of the sealing material and the hardness of the weir are substantially equal to each other. Further, the weirs 3a, 3b and 3c are set lower than spacers 4 and hence, the force PS which is applied to adhere the TFT substrate 1a and the CF substrate 1b to each other is equal to a force applied to adhere the TFT substrate and the CF substrate in the constitution in which only a usual sealing material is arranged whereby there arises no problem.

Here, in this embodiment, three weirs 3a, 3b and 3c are arranged below the sealing material 7. However, for preventing only the intrusion of liquid crystal into the sealing material 7, it may be sufficient to arrange only the weir 3a below the sealing material 7.

However, to the sealing material 7, the pushing-in force is applied also from a side opposite to the display region AR due to an atmospheric pressure and hence, the weir 3c for preventing the pushing-in of the atmospheric pressure below the sealing material 7 is arranged besides the weir 3a. It is necessary to form these weirs 3a and 3c in a continuous shape (a closed shape as shown in FIG. 1) to prevent the intrusion of liquid crystal and the atmospheric pressure at any positions.

Further, according to the present invention, the weir 3b is also arranged between the weir 3a and the weir 3c. The weir 3b is discontinuously formed along the surrounding direction. The weir 3b is also arranged to prevent the intrusion of the liquid crystal or to prevent the pushing-in of the atmospheric pressure. However, the weir 3b is exclusively provided as a provisional weir compared to the weirs 3a, 3c and hence, the weir 3b is formed discontinuously by taking the adhesiveness between the sealing material and the substrates into consideration. Here, although only one intermediate weir 3b is arranged in FIG. 1, a plurality of intermediate weirs 3b may be arranged. Further, provided that the adhesiveness between the substrates and the sealing material is favorable, the weir 3b may be formed in a continuous shape in the same manner as the weirs 3a, 3c.

Here, a manufacturing method of a liquid crystal display panel according to the present invention is explained. The manufacturing method of a liquid crystal display panel of the present invention is, compared to the manufacturing method of the related art shown in FIG. 9, first of all, characterized by including a weir forming step which continuously forms a weir such that the weir surrounds a display region. The weir is covered with a sealing material in a later sealing applying step and hence, the step differs from a step which arranges a wear arranged outside a sealing material.

Since this weir is provided for preventing the intrusion of the liquid crystal into the sealing material, the weir is made of a material having hardness larger than hardness of the sealing material. Here, whether the hardness of the weir is larger than the hardness of the sealing material or not is determined based on the hardness of the sealing material which is in an uncured state. For example, in case of the liquid crystal display panel in which the spacers are formed of columnar spacers, the weirs may be simultaneously formed with the formation of the columnar spacers. In this case, to prevent the weir according to the present invention from interrupting the force PS explained in conjunction with FIG. 7, it is necessary to make a height of the columnar spacers in the display region and a height of the weir which is formed in the same step as the step for forming the columnar spacers different from each other with respect to a surface of the substrate. This difference in height can be achieved by arranging the columnar spacers and the weir on a substrate side on which color filters are arranged, for example. The arrangement is simply explained hereinafter in conjunction with FIG. 3.

Figure 3:
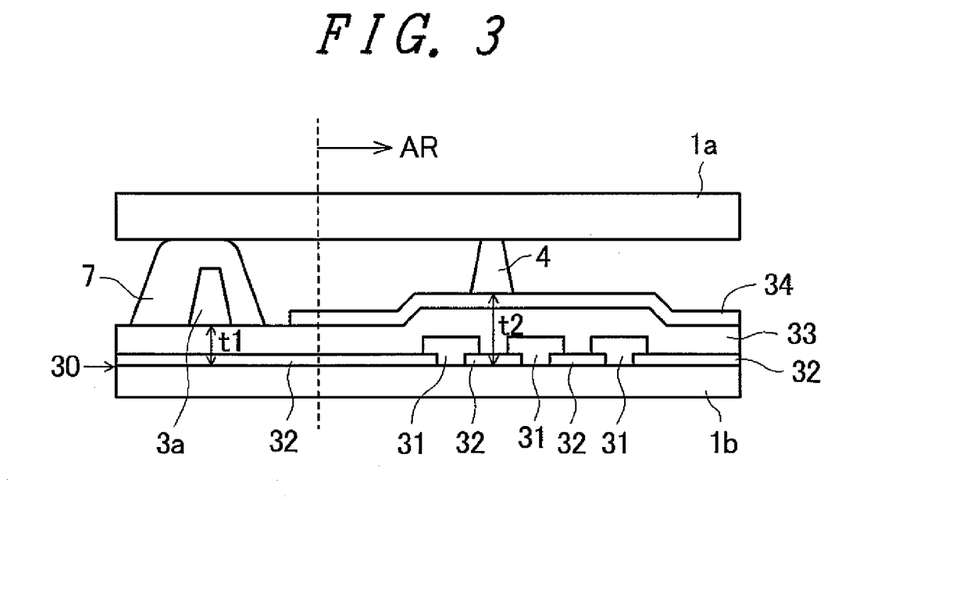
FIG. 3 is an explanatory view showing the relationship between spacers and a weir according to the present invention.

In FIG. 3, a color filter substrate 1b on which color filters 31 is arranged is shown at a lower portion of the drawing, while a TFT substrate 1a on which TFTs are formed is shown at an upper portion of the drawing. In FIG. 3, the detailed structure of the TFT substrate 1a side is omitted.

In FIG. 3, on the display region side of the color filter substrate 1b, the color filters 31 and black matrixes 32 which are arranged between the color filters 31 are arranged. Further, on these color filters 31 and black matrixes 32, a transparent protective film 33 is arranged and is leveled. Here, in case of the IPS-type liquid crystal display panel, an orientation film 34 is formed on the protective film 33. On the other hand, in case of the TN-type or VA-type liquid crystal display panel, electrodes are arranged between the orientation film 34 and the transparent protective film 33.

On the other hand, in the peripheral region in which the sealing material 7 is arranged, neither one of color filters 31, the orientation film 34 and, further, the electrodes depending on a driving system are not arranged. Accordingly, a height from a substrate surface 30 to a bottom surface of the columnar spacer 4 and a height from the substrate surface 30 to a bottom surface of the weir 3a differ from each other (t1<t2) by a thickness which corresponds to the non-arrangement of these parts. Accordingly, even when the columnar spacers 7 and the weir 3a are formed in the same step with the same height, it is possible to bring about a state in which the above-mentioned heights from the substrate surface 30 differ from each other.

When the heights from the substrate surface 30 to the bottom surfaces of the columnar spacer 4 and the height from the substrate surface 30 to the bottom surface of the weir 3a are equal, it is possible to manufacture the liquid crystal display panel without increasing steps using a half tone mask.

As another means for forming the weir, for example, by performing the step for arranging the weir and the step for arranging lines made of metal which are arranged on the display region by the same step, it may be possible to perform such arrangements without increasing the step for manufacturing a material harder than the sealing material. Here, for example, copper, aluminum, tungsten, molybdenum and alloy of these metals are used as materials of lines which are arranged on the display region, the weir of the present invention may be also made of these metals or alloy.

Other steps such as a liquid filling step, an adhesion step, and a sealing material curing step are substantially equal to steps in FIG. 9 which are explained as the related art.

Here, the present invention provides a technique particularly effective for an intermediate or miniaturized liquid crystal display panel having a size of 5 inches or less, while it is needless to say that the present invention is also applicable to a liquid crystal display panel which exceeds 20 inches.

Further, it is needless to say that the columnar spacers may be arranged on either one of a pair of substrates (TFT substrate, color filter substrate).

Embodiment 2

Figure 4:
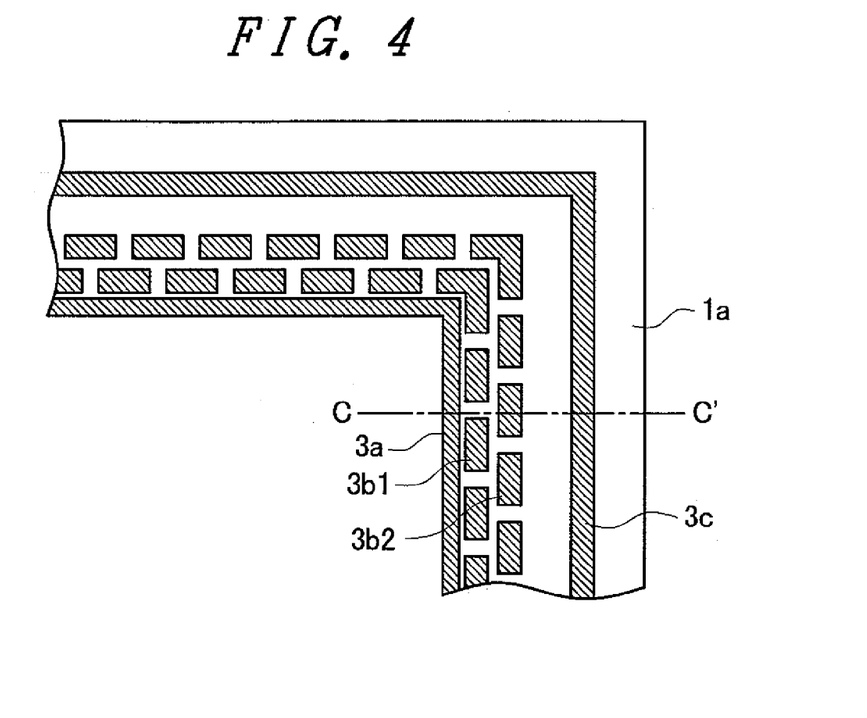
FIG. 4 is an enlarged planer arrangement view of a weir of an embodiment 2 according to the present invention.
Figure 5:
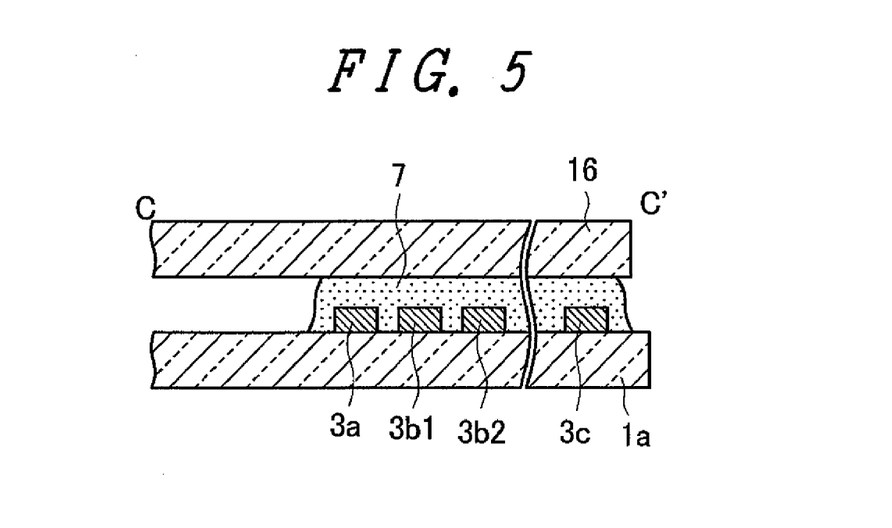
FIG. 5 is a cross-sectional view taken along a line C-C' in FIG. 4 showing one substrate together with another substrate.

FIG. 4 is a view showing another embodiment of the present invention. FIG. 4 shows the constitution in which two intermediate weirs 3b1, 3b2 are arranged. FIG. 5 is a cross-sectional view taken along a line C-C' in FIG. 4 showing one substrate together with another substrate. As shown in FIG. 4 and FIG. 5, an innermost peripheral weir 3a and an outermost peripheral weir 3c are made of a closed weir. That is, the innermost peripheral weir 3a and the outermost peripheral weir 3c are formed over the entire circumference with the same height. Further, the weirs 3b1, 3b2 are discontinuously formed along the surrounding directions.

Due to such a constitution, it is possible to acquire the liquid crystal display panel which can sufficiently prevent the intrusion of the liquid crystal or the pushing-in of the atmospheric pressure and, at the same time, can enhance the adhesiveness of the sealing material to the substrate.

It is needless to say that this embodiment 2 also can obtain the highly reliable liquid crystal display panel which can prevent a leak path of the sealing material even when the liquid crystal intrudes into the uncured sealing material in the sealing step.

Embodiment 3

FIG. 6 is a plan view of one substrate for explaining a liquid crystal display panel of an embodiment 3 according to the present invention. The present invention may form at least one of a plurality of weirs in a zigzag shape. In the embodiment 3, all of three weirs 3a, 3b, 3c are formed in a zigzag shape, wherein a first innermost peripheral weir 3a and a third weir 3c which constitutes an outermost peripheral weir are closed, and a second weir 3b is discontinuously formed with a gap therebetween. In the embodiment 3, although the number of weirs is set to three, the number of weirs may be three or more and may be four or more in the same manner as the embodiment 1. By forming the weirs in a zigzag shape, it is possible to increase a contact area with the sealing material which is arranged to cover the weir thus increasing the adhesiveness between the sealing material and the substrate.

Also in the embodiment 3, it is possible to obtain the highly reliable liquid crystal display panel which can prevent a leak path of the sealing material when the liquid crystal is brought into contact with the uncured sealing material in the sealing step or the reduction of the effective sealing width.

What is claimed is:

1. A liquid crystal display panel which forms a display region by providing liquid crystal in a gap defined between one substrate and another substrate, wherein an innermost weir continuously formed so as to surround the display region, an outermost weir is continuously formed so as to surround the innermost weir, and at least one intermediate weir is discontinuously formed along a path which surrounds the innermost weir between the innermost weir and the outermost weir, and a sealing material which is arranged to cover the innermost weir, the outermost weir and the at least one intermediate weir is arranged on a surface of one substrate.

2. A liquid crystal display panel according to claim 1, wherein spacers which control a distance between one substrate and another substrate are arranged on the surface of one substrate or a surface of another substrate within the display region.

3. A liquid crystal display panel according to claim 2, wherein the spacer is a columnar spacer, and each of the innermost weir, the outermost weir and the at least one intermediate weir is formed of the same material as a material of the spacer.

4. A liquid crystal display panel according to claim 2, wherein color filters and the spacers are arranged on one substrate.

5. A liquid crystal display panel according to claim 1, wherein the at least one intermediate weir includes at least first and second intermediate weirs discontinuously formed along paths spaced from one another so as to surround the innermost weir between the innermost weir and the outermost weir.

6. A liquid crystal display panel according to claim 1, wherein at least one of the innermost weir and the outermost weir is formed in a zigzag shape.

7. A liquid crystal display panel according to claim 6, wherein the at least one intermediate weir is formed in a zigzag shape.

* * * * *